United States Patent Office 3,122,529
Patented Feb. 25, 1964

3,122,529
PREPARATION OF STILBENE AZO DYES
William G. Huey, Nassau, and Salvatore L. Cannone, Albany, N.Y., assignors to General Aniline & Film Corporation, New York, N.Y., a corporation of Delaware
No Drawing. Filed Nov. 16, 1959, Ser. No. 853,010
4 Claims. (Cl. 260—143)

This invention pertains to an improved method of producing stilbene azo dyes. In particular it pertains to a method of producing stilbene azo dyes of a greener and brighter shade than was previously possible.

It is well known to produce stilbene azo dyes by the reduction of 4,4'-dinitro-2,2'-stilbenedisulfonic acid, see for example, The Chemistry of Synthetic Dyes by K. Venkataraman, Academic Press, N.Y. (1952), vol. 1, pp. 630-2. In particular, aldehydes such as glucose have been used as reducing agents, although other reducing agents have been tried. A common commercial process for preparing stilbene azo dyes involves the reduction, under alkaline conditions, of 4,4'-dinitro-2,2'-stilbene disulfonic acid, or the metallic salt thereof, e.g. the disodium salt, with a reducing agent such as glucose, sodium sulfite, sodium sulfide, formaldehyde, acetaldehyde and the like, to produce dyes known as Stilbene Yellows.

The problem connected with the production of stilbene azo dyes has always been to produce dyes of a uniformly greenish yellow shade, having good brightness.

In dye chemistry the greener the shade of yellow, the more desirable. This is primarily because a greenish yellow can be easily shaded to redder shades by mixing with red and orange dyes, but it is difficult to reverse the procedure and convert a redder shade to a greener shade.

We have now discovered a method of reducing 4,4'-dinitro-2,2'-stilbenedisulfonic acid wherein the shade is consistently a bright greenish yellow shade.

This is accomplished by a two-fold change in the usual process. First, a lower alkylolamine was employed as reducing agent. The lower alkylolamine which may be employed in practicing the present invention are thus the alkylol groups of which contain 2 to 3 carbon atoms each and include mono-, di- and tri-ethanolamine, and mono-, di- and tri-propanolamine, N-methyldiethanolamine, diethylaminoethanol, 2-methyl-2-amino-propanol, di- and tri-ethyleneoxyethanolamine and the like. A minimum of two molar equivalents of alkylolamine per mole of 4,4'-dinitro-2,2'-stilbene disulfonic acid up to about a 100% excess of alkylolamine may be used.

The second change is that the reduction is carried out in the presence of about 5–20% of a water-soluble neutral salt, based on the volume of water used. Sodium chloride has been found effective and is preferred from a standpoint of cost, although other neutral salts, whose cation forms no difficultly water soluble or difficultly filterable salt of the dyestuff, such as the water-soluble sulfates or halides of alkali metals such as the sodium and potassium salts or ammonium salts, e.g. sodium bromide, sodium sulfate and the like may be employed. It is believed that the salting technique causes the greenish type dye to be precipitated on formation thus inhibiting further reduction to the red type. We do not, however, wish to be limited to this theory of operation. While the use of water-soluble salts in the production of stilbene azo dyes is known (U.S. Patent 2,865,908), it has been found that by the process of the present invention in which an alkylolamine is used as the reducing agent, that an improved yield of dyestuff of improved strength is obtained.

In brief the process of the present invention for producing the dye is to combine the 4,4'-dinitro-2,2'-stilbenedisulfonic acid with water, alkylolamine and salt, heat the thus formed mixture, preferably to from about 80–100° C. for a sufficient time for reaction to occur, i.e., about 10–25 hours, followed by cooling, filtering and drying.

The following examples illustrate the invention:

Example 1

43 grams 4,4'-dinitro-2,2'-stilbenedisulfonic acid sodium salt (0.1 mole) was dissolved in 300 cc. water. To this was added 54 grams sodium chloride and 43 grams diethanolamine (.41 mole). This mixture was stirred at 92° C. for 15–18 hours, cooled to 85° C., filtered and dried.

The dye thus formed was bright yellow in color and dyed paper in bright greenish yellow shades.

Example 2

43 grams 4,4'-dinitro-2,2'-stilbenedisulfonic acid sodium salt was stirred into 200 cc. water. To this was added 36 g. sodium chloride and 26.2 g. diethanolamine (0.25 mole). This mixture was stirred at 92° C. for 24 hours, cooled to 85° C. and treated with 15 cc. of 68.5% nitric acid to obtain a weak test on Congo paper. It was filtered at 85° C., washed and dried. The dye thus formed was bright yellow in color and dyed paper in bright greenish yellow shades.

Example 3

Example 2 was repeated, except that 23 cc. of 31.5% hydrochloric acid was substituted for the nitric acid. The dye thus formed was a bright greenish yellow in color and dyed paper in bright greenish yellow shades.

Acidification, prior to filtering, to a pH of about 4 or lower, if desired, as illustrated in Examples 2 and 3 above, gives a somewhat greener shade. This acidification can be carried out with any non-reducing acid, preferably inorganic, such as hydrochloric, nitric, sulfuric and phosphoric acids.

Example 4

43 grams 4,4'-dinitro-2,2'-stilbenedisulfonic acid sodium salt (0.1 mole) was dissolved in 200 cc. water. To this was added 36 grams sodium chloride and 36 grams diisopropanolamine (0.27 mole). This mixture was stirred at 92° C. for 24 hours, cooled to 90° C., filtered and dried.

The resulting dye, a yellow powder, dyes paper in bright greenish yellow shades.

Example 5

Example 4 was repeated, except that 32 grams N-methyldiethanolamine (0.27 mole) were used in place of the 36 grams diisopropanolamine.

The resulting dye, a yellow powder, dyes paper in bright greenish yellow shades.

While as illustrated in the foregoing examples, the 4,4'-dinitro-2,2'-stilbene disulfonic acid was employed in the form of its alkali metal salts (e.g. the disodium or dipotassium salt), it has been found that the process is also operative employing the 4,4'-dinitro-2,2'-stilbene disulfonic acid in the form of the free acid.

We claim:

1. The process of producing stilbene azo dyes which comprises treating 4,4'-dinitro-2,2'-stilbene disulfonic acid in an aqueous medium with at least 2 molar proportions thereof of an alkylolamine, the alkylol groups of which contain 2–3 carbon atoms each in the presence of 5 to 20% based on the amount of water present of a water-soluble neutral salt of a member of the group consisting of alkali metals, and ammonia, thereafter acidifying the reaction mixture to a pH not gerater than 4 and recovering the thus produced dyestuff.

2. The process as defined in claim 1 wherein the alkylolamine is diethanol amine.

3. The process as defined in claim 1 wherein the water-soluble salt is sodium chloride.

4. The process as defined in claim 3 wherein the alkylolamine is diethanolamine.

References Cited in the file of this patent

UNITED STATES PATENTS

| | | |
|---|---|---|
| 1,878,501 | Lyford | Sept. 20, 1932 |
| 2,865,908 | De Hoff | Dec. 23, 1958 |

OTHER REFERENCES

Meltsner: J.A.C.S., 57, 2554 (1935).
Meltsner et al.: J.A.C.S., 59, 2660 (1937).
Meltsner et al.: J.A.C.S., 60, 1236 (1938).
Meltsner et al.: J.A.C.S., 62, 991 (1940).
Kremer: JA.C.S., 59, 1681 (1937).
Kremer et al.: J.A.C.S., 60, 1031 (1938).